(12) United States Patent
Kim (10) Patent No.: US 12,425,726 B2
(45) Date of Patent: Sep. 23, 2025

(54) CAMERA SERVICE SYSTEM AND METHOD

(71) Applicant: Deok Woo Kim, Seoul (KR)

(72) Inventor: Deok Woo Kim, Seoul (KR)

( * ) Notice: Subject to any disclaimer, the term of this patent is extended or adjusted under 35 U.S.C. 154(b) by 286 days.

(21) Appl. No.: 18/025,946

(22) PCT Filed: Sep. 16, 2021

(86) PCT No.: PCT/KR2021/012745
§ 371 (c)(1),
(2) Date: Mar. 13, 2023

(87) PCT Pub. No.: WO2022/060144
PCT Pub. Date: Mar. 24, 2022

(65) Prior Publication Data
US 2023/0362485 A1    Nov. 9, 2023

(30) Foreign Application Priority Data

Sep. 16, 2020   (KR) ........................ 10-2020-0119115

(51) Int. Cl.
*H04N 23/661*    (2023.01)
*G06V 20/40*    (2022.01)
(Continued)

(52) U.S. Cl.
CPC ........... *H04N 23/661* (2023.01); *G06V 20/41* (2022.01); *H04N 21/262* (2013.01);
(Continued)

(58) Field of Classification Search
CPC .. H04N 23/661; H04N 21/262; H04N 21/482; H04N 23/62; H04N 23/69;
(Continued)

(56) References Cited

U.S. PATENT DOCUMENTS

2009/0037387 A1\* 2/2009 Kim ................... H04N 21/8405
2018/0107213 A1\* 4/2018 Kuhara ................ G05D 1/0055
(Continued)

FOREIGN PATENT DOCUMENTS

JP    2003-006532 A    1/2003
JP    2003-023619 A    1/2003
(Continued)

OTHER PUBLICATIONS

International Search Report of PCT/KR2021/012745 dated Jan. 7, 2022 [PCT/ISA/210].

*Primary Examiner* — Christopher K Peterson
(74) *Attorney, Agent, or Firm* — Sughrue Mion, PLLC (57) ABSTRACT

A camera service is configured such that a user can view an image while directly controlling a camera station including a camera installed on a platform. The camera service provides images of tourist spots, scenic spots, and other places of interest. The user can view the images of tourist spots, scenic spots, and other places of interest in real time while directly controlling the camera, installed on the movable or fixed platform, through a camera service server. The user is connected to the camera station through a wired/wireless network, and can control the direction, zoom-in, zoom-out, etc. of the camera for a predetermined time. If the user wants exclusive use of the camera, the user can pay a fee.

19 Claims, 7 Drawing Sheets

(51) Int. Cl.
  *H04N 17/00*      (2006.01)
  *H04N 21/262*     (2011.01)
  *H04N 21/482*     (2011.01)
  *H04N 23/62*      (2023.01)
  *H04N 23/69*      (2023.01)
  *H04N 23/695*     (2023.01)

(52) U.S. Cl.
  CPC ........... *H04N 21/482* (2013.01); *H04N 23/62* (2023.01); *H04N 23/69* (2023.01); *H04N 23/695* (2023.01); *H04N 17/002* (2013.01)

(58) Field of Classification Search
  CPC .... H04N 23/695; H04N 17/002; H04N 23/00; H04N 23/80; G06V 20/41; G06T 3/40
  See application file for complete search history.

(56) References Cited

U.S. PATENT DOCUMENTS

2020/0106931 A1\* 4/2020 Montgomery ......... H04N 23/66
2021/0352222 A1\* 11/2021 Zavesky .................. G06T 5/50

FOREIGN PATENT DOCUMENTS

| JP | 2007-213364 A | 8/2007 |
| JP | 2017-119501 A | 7/2017 |
| KR | 10-2009-0075593 A | 7/2009 |
| KR | 10-1808157 B1 | 12/2017 |

\* cited by examiner

FIG. 1

CAMERA STATION     USER TERMINAL DEVICE

CAMERA SERVICE SYSTEM AND METHOD

CROSS REFERENCE TO RELATED APPLICATIONS

This application is a National Stage of International Application No. PCT/KR2021/012745 filed Sep. 16, 2021, claiming priority based on Korean Patent Application No. 10-2020-0119115 filed on Sep. 16, 2020.

TECHNICAL FIELD

The present invention relates to a camera service system and a method thereof that allow a user to capture videos by directly controlling a camera(s) installed at tourist attractions, scenic spots, other sites of interest, vehicles, yachts, helicopters, hot air balloons, drones, etc. and to view the captured videos through a television (TV), a personal computer (PC), a portable device, etc.

BACKGROUND ART

Almost all people long for places that they have never been to and have memories of places that they have been to. In particular, many people visit and want to visit widely known tourist attractions or scenic spots. However, it is not easy to visit tourist attractions or scenic spots in person due to time and cost constraints. Also, sometimes people want to see the sunset on their way home from work, see the sunrise while drinking coffee, drive along the beach, or walk in the woods. In practice, however, it is impossible to immediately move to an appropriate place, and thus it ends up happening in their imaginations.

The above desires can be somewhat satisfied through video sites, of which YouTube is a typical example, or Google Maps. In other words, it is possible to partially satisfy the desires by searching for and viewing a video of a desired tourist attraction or scenic spot among videos uploaded by others. Also, it is possible to view in real time a video of a specific area through a video site that relays videos of various places in real time. For example, people can view a video of Dokdo (the eastern island in Korea) in real time through a Dokdo-related website.

However, even in the case of viewing a video through such a website, it is impossible to manually manipulate a camera in real time. Further, it is almost impossible to view a video obtained while directly moving a platform on which a camera is installed in real time.

This is true not only for tourism, travel, etc., but also for places of interest such as construction sites, real estate, restaurants, etc.

DISCLOSURE

Technical Problem

The present invention proposes a camera service for providing videos of tourist attractions, scenic spots, and other places of interest so that a user can view videos while personally manipulating a camera(s) installed on a platform.

Technical Solution

One aspect of the present invention provides a camera service system and method having a function of enabling a user to view videos of tourist attractions, scenic spots, or other places of interest in real time through a user terminal device while personally manipulating a camera station which is installed on a movable or fixed platform and includes a manipulatable camera, through a camera service server. The user may be connected to the camera station through a wired or wireless network to control movement of the platform, a direction, zoom-in and zoom-out of the camera, etc. for a certain period of time. If the user wants to exclusively use the camera station, he or she may pay a fee. When a plurality of cameras are installed on a single platform, the camera service system recognizes that there are a plurality of camera stations corresponding to the number of cameras, but recognizes, as one camera, a panoramic camera unit obtained by combining a plurality of cameras which generate a panoramic video and provide a part of the panoramic video in accordance with an imaging direction without mechanical imaging direction control.

The platform on which the camera is installed may be either of a fixed type which is installed at a place of interest, or of a mobile type such as a drone, a car, a train, a boat, a submarine, a rocket, an airplane, a helicopter, a hot air balloon, a person, etc. In the case of unmanned platforms, such as a drone or an unmanned car, among the mobile type platforms, the user may set up a travel route on a server through a network or on a computer on the platform, or may control the platform in real time. Meanwhile, in the case of manned platforms, such as a car, a train, a yacht, a hot air balloon, etc., a travel route may be set up by the user providing information on the travel route to an operator/pilot of the manned platform and the operator/pilot moving the manned platform according to the information. To facilitate exchange of the information on the travel route between the user and the platform, it is preferable to provide a site map of the place of interest and a control screen. Meanwhile, in the case of controlling the platform in real time, it is more preferable to divide the user terminal device into a user video terminal device and a user control terminal device and separately use the divided terminal devices.

Additionally, if camera stations are installed at a plurality of places of interest, the user may select a desired one of the camera stations. The user may receive a captured video from the camera station that he or she selects. In this case, the user may receive his or her own videos obtained by grouping the plurality of camera stations by specific areas or specific themes (e.g., sunset, forests, beaches, nights with a full moon, rainy streets, etc.). In this case, the videos may be sequentially provided in a way set up by the user.

Further, when the user controls the camera to zoom in and the face or a specific part of a person increases to a certain size or more, zooming in may be forcedly terminated, or the face or specific part may be mosaicked. Meanwhile, personal information, such as a company name, a phone number, a vehicle number, etc., may be mosaicked so that the camera may continuously zoom in on the personal information but the information may not be identified. The camera service may be operated so that the personal information is demosaicked when an owner of the company name, the phone number, or the vehicle pays an advertising fee.

The camera service system of the present invention may provide captured videos to the user in real time without any change or in combination with a video (e.g., a picture, such as a pastel painting, a watercolor painting, etc., or a video image-processed in the form of a cartoon) processed with a video processing technology (e.g., image processing) or a specific image (letters, a symbol string, a photograph, etc.).

As for sounds of videos, the original sound (real sound in the field) may be provided without any change, whereas, in accordance with sound control information which is set up in advance by the user, the original sound may be removed, or background sounds, such as the sound of a brook, the sound of wind, the sound of waves, the sound of birds, a sound recorded in a forest, music, etc., may be inserted into videos in addition to the original sound. Alternatively, it is also possible for a user to access a sound source website through the user's portable device and to receive and play a sound source together with a video.

When the user wants to exclusively use the camera station, he or she pays a service usage fee. The user who pays the fee may be given a control of the direction, zoom-in, zoom-out, etc. of the camera to enjoy a video service for the certain period of time.

In accordance with an intention of an occupant (e.g., an exclusive user who pays the fee) of the camera station, videos of the camera station may be shared with other people who try to view the video for free. The people who try to view the videos for free receive the videos with advertisements, and the advertising revenue may be shared with the occupant of the camera station at a certain ratio. In this way, third parties are allowed to view advertisements and the videos, and usage fees may be paid in a shared manner. In this case, the shared amounts may be transferred to a user account and may be offset against the usage fee or returned in cash.

The above-described concept of the present invention will become more apparent through detailed embodiments described below with reference to the accompanying drawings.

Advantageous Effects

According to the present invention, a user can not only passively view videos of a desired tourist attraction, scenic spot, or other places of interest through an existing website but also personally manipulate a camera in real time. Further, the user can view a video obtained while personally moving a camera-installed platform, such as a drone or a vehicle, in real time. Third parties who do not pay a usage fee can access a video service system and view a video for free after viewing an advertisement.

In addition, according to the present invention, it is possible to notably reduce the probability of infection from viruses, pathogens, germs, etc. caused by face-to-face contact between people, which is inevitable when people personally go to and see a place of interest.

MODES OF THE INVENTION

Hereinafter, embodiments in which the spirit of the present invention introduced above is specifically implemented will be described. However, the technical scope of the present invention is not limited to the embodiments and accompanying drawings described below. The technical scope is to be determined by reasonable interpretation of the claims.

Figure 1:
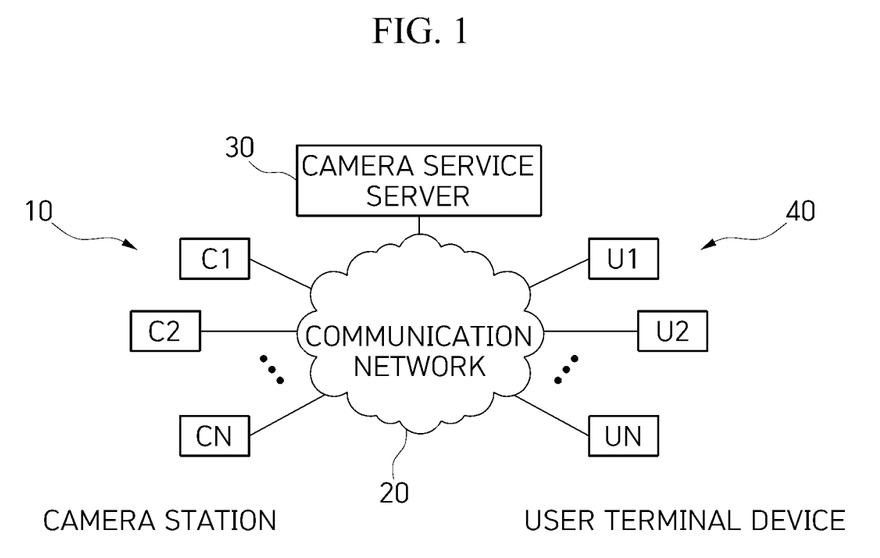
FIG. 1 is a block diagram of a camera service system according to the present invention.

FIG. 1 is a schematic block diagram of a camera service system according to the present invention.

There are camera stations C1, C2, . . . , and CN (10) including one or more cameras that are installed on either a movable or a fixed platform to capture tourist attractions, scenic spots, or other places of interest. The camera stations 10 are connected to a camera service server 30 through a communication network 20. Users access the camera service server 30 through the communication network 20 and are connected to the camera stations 10 through the camera service server 30 using a user terminal device U1, U2, . . . , and UN (40) to manipulate the camera stations 10 and view videos for a certain period of time. When the users want to exclusively use the camera stations 10, the users pay a usage fee.

Figure 2A:
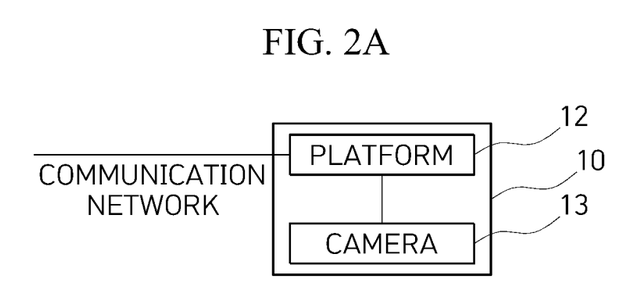
FIGS. 2A and 2B are block diagrams of a camera station (10) according to the present invention.

Referring to FIG. 2A, in the camera station 10, a camera 13 is installed on a platform 12. In general, it is preferable that the platform 12 handle movement of the camera 13 and the camera 13 handle video and sound. In addition, since it is preferable that each camera station 10 have one communication device, the connection with the camera service server 30 may be entirely handled by the platform 12, and information transmitted to and received from the camera may be handled through a dedicated communication line placed between the platform 12 and the camera 13. This is illustrated in FIG. 2A.

Figure 2B:
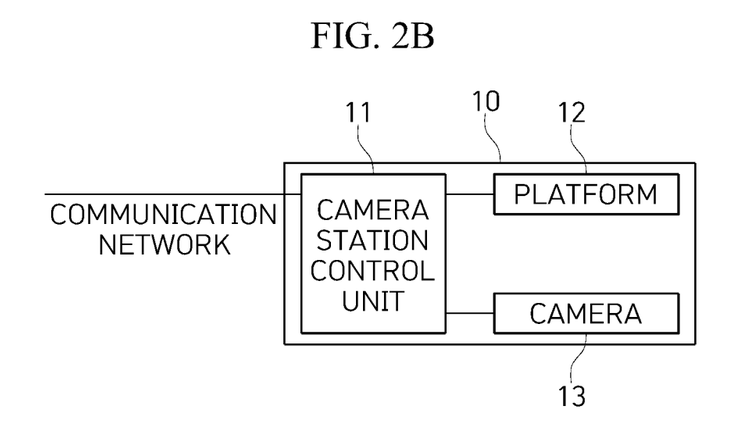

FIG. 2B shows a method of additionally providing a camera station control unit 11 and connecting both of the platform 12 and the camera 13 to the camera station control unit 11. Here, the camera station control unit 11 handles communication with the camera service server 30 through the communication network. The camera station 10 may be fixed at a place of interest (fixed camera station) or may be movable to provide a variety of three-dimensional (3D) videos to users (mobile camera stations). Mobile camera stations use mobile platforms. In this case, as the platforms, ground mobile machines, such as cars and trains, flying machines, such as drones, hot air balloons, or airplanes/helicopters, maritime mobile machines, such as boats and yachts, space vehicles, such as space launch vehicles, underwater mobile machines, such as submarines, etc. may be used. Even a person may be used as a mobile platform so that the person moving with a camera may be the camera station 10. Meanwhile, when the camera station 10 uses a mobile platform, a travel route is displayed on a map in a user terminal device 40 so that a user can easily recognize the travel route of the camera.

If the camera station 10 either uses a human or uses a manned platform having an operator or a pilot, such as an airplane or helicopter, vehicle, hot air balloon, boat, ground mobile machine, maritime mobile machine, flying machine, space vehicle, underwater mobile machine, etc., the user provide information on travel routes to the operator or the pilot, and the operator or the pilot move the manned mobile platform to a location desired by the user so that the camera station 10 is moved.

Figure 3A:
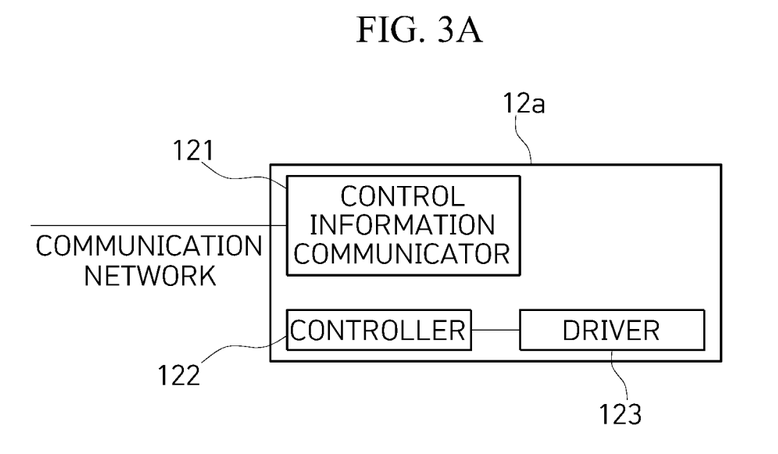
FIG. 3A is a block diagram of a manned platform (12a).
Figure 3B:
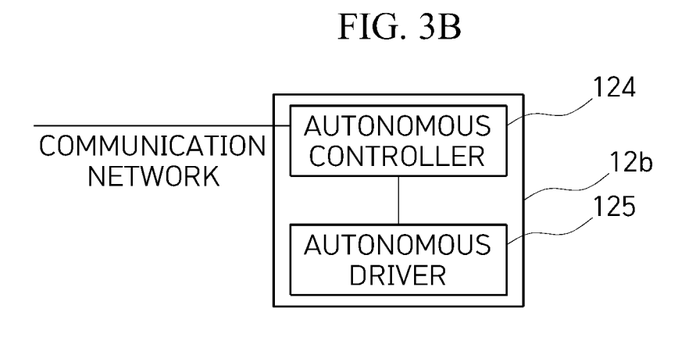
FIG. 3B is a block diagram of an unmanned platform (12b).

This is illustrated in FIG. 3A. A manned mobile platform 12*a* includes a control information communicator 121 that receives control information for manipulation transmitted by a user through a network using the user terminal device 40 and displays the control information to a platform operator or pilot, a controller 122 enabling the operator or pilot to control movement of the platform 12*a*, and a driver 123 connected to the controller 122 and moving the platform 12*a*. Accordingly, the operator or pilot controls the driver 123 using the controller 122 according to the control information displayed in the control information communicator 121, thereby controlling movement of the platform 12*a*. Therefore, a combination of the controller 122 and the driver 123 may be substantially the corresponding manned platform. Meanwhile, when the information on the travel route is transmitted and received between the user (i.e., the user terminal device 40) and the platform 12*a*, a site map, a control screen, etc. are provided to the user and/or the operator or pilot of the manned platform. Also, a voice channel may be additionally added and used between the user and the operator or pilot of the manned platform. Meanwhile, when the camera station 10 is a ground mobile machine, a maritime mobile machine, a flying machine, a space vehicle, an underwater mobile machine, etc. capable of autonomous movement, such as a drone or unmanned car, an unmanned mobile platform 12*b* includes, as shown in FIG. 3B, an autonomous controller 124 for receiving control information from the camera service server 30 through the communication network and controlling movement of the unmanned mobile platform 12*b* according to the control information and an autonomous driver 125 connected to the autonomous controller to move the platform 12*b*. Here, it is preferable that the autonomous controller 124 compare the received control information with preset operable range information and control autonomous movement of the platform 12*b* according to the control information when the control information is within the operable range. A function of examining the operable range may be implemented in the camera service server 30. Accordingly, a combination of the autonomous controller 124 and the autonomous driver 125 becomes something like a drone, meaning an unmanned platform of which operations are controlled according to commands of the camera service server 30 and which has a function of transmitting a video.

Such an unmanned platform 12*b* capable of autonomous movement may store information on an area in which the unmanned platform 12*b* is movable, compare received control information with the stored information, and control itself to be in the area in which the unmanned platform 12*b* is movable at all times. Also, the unmanned platform 12*b* may have a function of returning to a starting location or moving to a nearby emergency standby location and waiting according to a determined algorithm when an uncontrollable situation occurs such as battery discharge, a wind speed increase, a traffic accident, etc.

Meanwhile, if the plurality of camera stations 10 are installed, the user can select specific camera stations 10 and receive videos. In this case, the user may automatically and sequentially receive his or her own videos obtained by grouping the plurality of camera stations 10 by specific areas or specific themes (e.g., sunsets, forests, beaches, nights with a full moon, rainy streets, etc.). To this end, the camera service server 30 may provide a function of searching for videos provided by the plurality of camera stations 10 by keyword. Meanwhile, the user may set periods of time and an order of camera stations that he or she selects so that the camera stations automatically provide videos in sequence.

Also, according to the present invention, it is possible to extend a service range by enabling third parties to access a camera service server. In other words, a third party that has a camera station other than camera stations that a camera service provider has may provide his or her camera station to a video service provider of the present invention and receive a commission or share an income generated from use of the provided camera station. In this case, first, the third party should determine characteristics of the camera station and a camera service that the third party will provide and obtain approval from the video service provider. Only when the characteristics are approved, is it possible to connect the camera station to the camera service system and provide the camera service. The provider should ensure compatibility by checking a protocol or equipment related to control and communication network access of a platform and a camera used in the camera station. For example, the third party can provide the camera service by installing the camera station on a scenic rooftop of his or her building, leasing the camera station, and receiving a commission or by setting the camera station with a camera installed in his or her vehicle, yacht, airplane, hot air balloon, etc. and then driving, navigating, or flying through a scenic place. In this case, it is preferable to display a travel route of the camera station, a time at which the service is started (e.g., 13:00), a length of time for which the service is provided (e.g., 15 minutes), a sample video, etc. together on a map so that the user can easily recognize a video.

Figure 4:
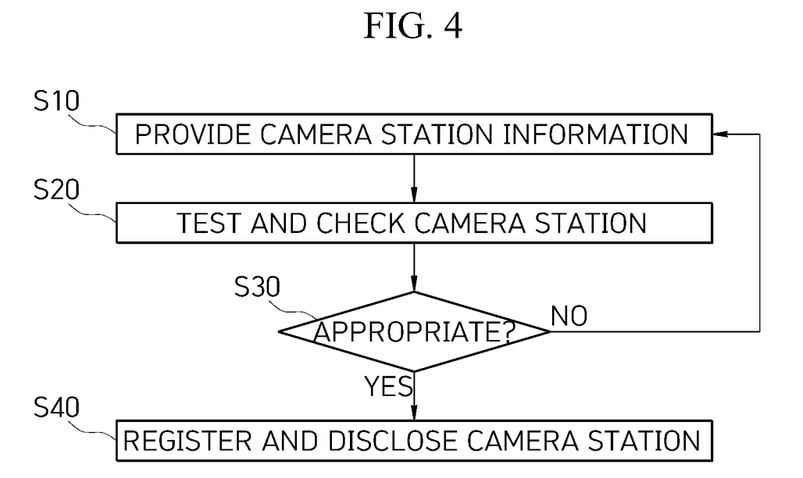
FIG. 4 is a flowchart of a third-party service authentication operation.

In this way, more people are guided to participate in the camera service of the present invention so that the camera service business can be activated. In this case, the third party provides his or her camera station to the provider under a contract. According to an embodiment, as shown in FIG. 4, after an operation S10 in which a camera station owner provides his or her camera station information including platform-related information, camera-related information, and a service plan to a camera service provider, an operation S20 in which the camera service provider checks the provided camera station information, tests the corresponding camera station, and determines whether to register the corresponding camera station at an appropriate time, and an operation S40 of registering the corresponding camera station in a camera service system and disclosing the corresponding camera station to users when it is determined to register the corresponding camera station (S30), the users may select and use the corresponding camera stations.

Here, the camera station information may include information about whether the corresponding platform is of a mobile type or a fixed type. In the case of the fixed type, the camera station information also includes information on a location and altitude, and in the case of the mobile type, the camera station information also includes information on whether the corresponding platform is of an autonomous movement platform or a manned platform and information on a route along which the platform is movable. Also, camera information may include information on a zoom function, direction control, and a resolution.

Figure 5A:
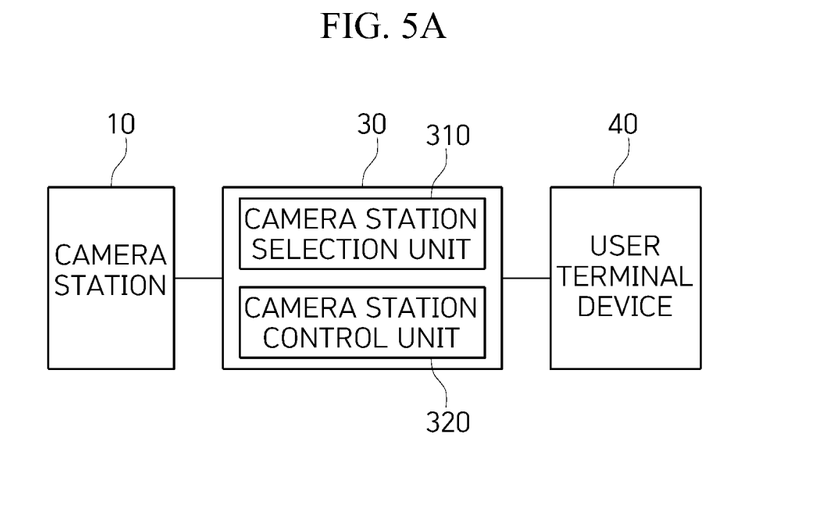
FIG. 5A is a diagram illustrating the flow of control information in the camera service system according to the present invention.

FIG. 5A is a diagram illustrating the flow of control information according to a camera service of the present invention. The user selects one or more camera stations 10 using the user terminal device 40, which is handled by a camera station selection unit 310. Information related to the camera stations 10 selected by the user is stored in user account information. After that, user control information is generated in the user terminal device 40 and transmitted to the camera service server 30. Subsequently, a camera station control unit 320 in the camera service server 30 generates final control information by considering the user control information and states of the camera stations 10 and transmits the final control information to the camera stations 10. The camera stations 10 control the platforms 12 and the cameras 13 according to the received final control information. The user control information may be generated in real time or selected by the user from control cases presented by the camera service server 30. Also, the generated control information may be stored in the user account according to a schedule set by the user and transmitted to the camera stations 10 and used for control.

Figure 5B:
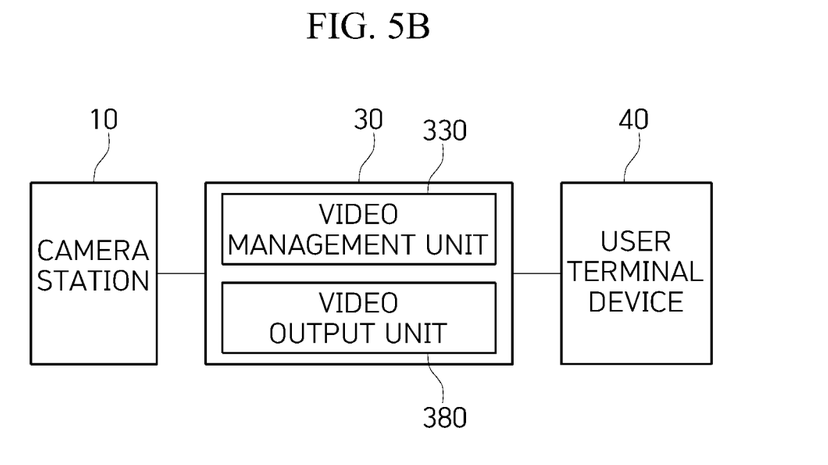
FIG. 5B is a diagram illustrating the flow of media information in the camera service system according to the present invention.

FIG. 5B is a diagram illustrating the flow of media information (video information+audio information) according to a camera service of the present invention. Media information generated by the camera 13 is transmitted to a video management unit 330 of the camera service server 30 through the camera station 10. A video transmitted to the video management unit 330 is selectively stored but is transmitted to the user terminal device 40 through a video output unit 380 sequentially through a video processing unit 340, a sound processing unit 350, a video analysis unit 360, and a billing and advertisement processing unit 370.

Figure 6A:
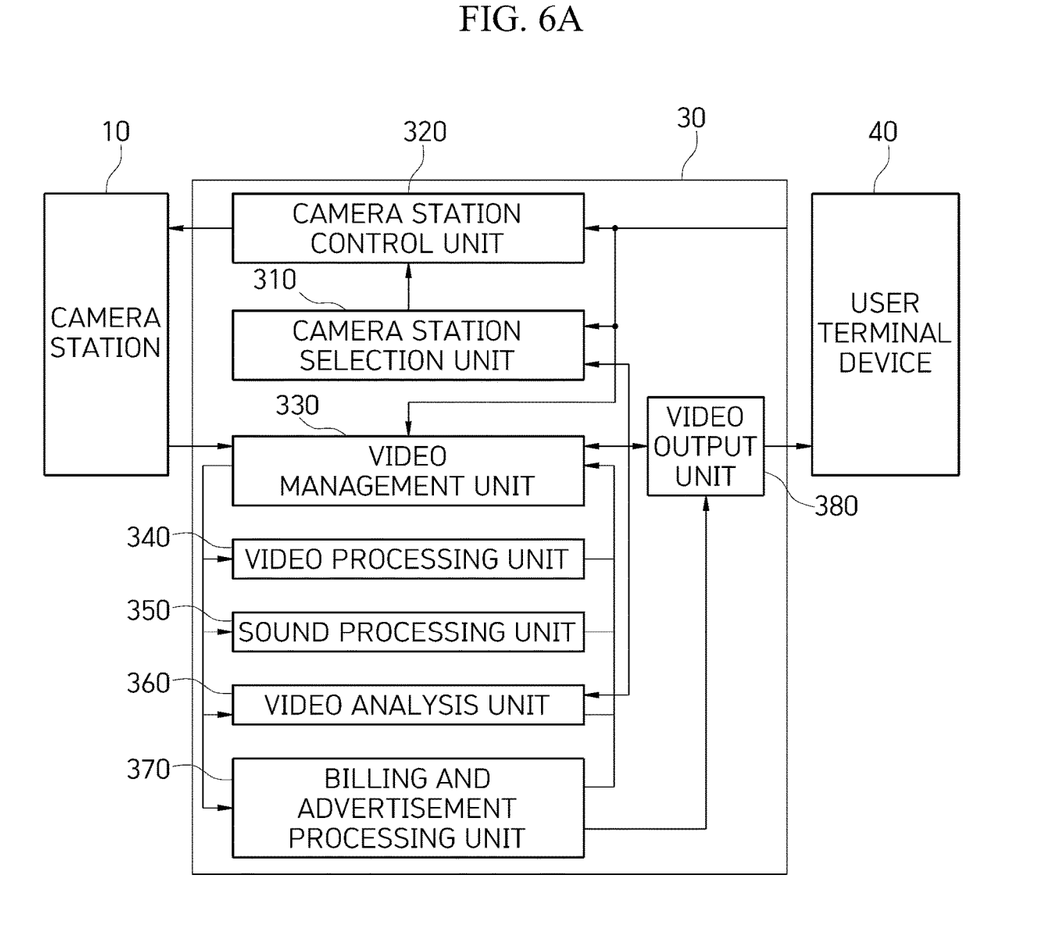
FIGS. 6A and 6B are example block diagrams of a camera service server (30).

FIG. 6A is an embodiment of a configuration of the camera service server 30. The configuration of the camera service server 30 is merely an example. According to implementation examples, several components may be combined into one component, or some components may be excluded and separately implemented or moved to the platform 12 or the camera 13 of the camera station 10. In practice, it is preferable that the camera service server 30 include a plurality of workstations or database (DB) servers.

Figure 6B:
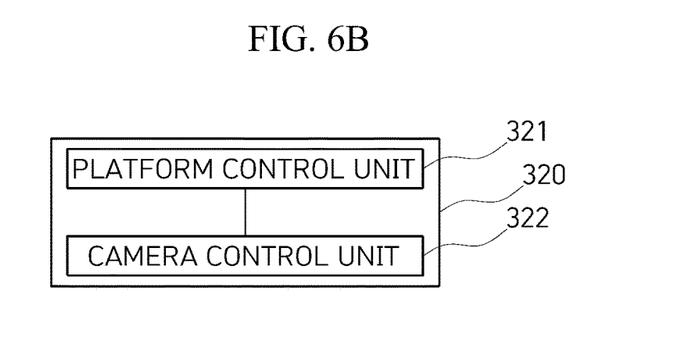

The camera station selection unit 310 handles a function of presenting information on the plurality of camera stations 10 connected to the camera service server 30 and helping a user to select the camera stations 10. To this end, a fixed keyword (platform information, camera information, etc.) and a variable keyword (the weather, the time, a travel route, etc.) are given to each of the camera stations 10 and managed. As necessary, the user may select a plurality of camera stations 10, schedule videos provided by the camera stations 10 according to his or her own setting, and view the videos using the user terminal device 40. The camera station control unit 320 transmits control information input by the user to a designated camera station 10 to control movement of the platform 12 or control directional changes (tilting, rotation, etc.), zoom-in and zoom-out functions, etc. of the camera 13. This process may additionally include collateral information exchange for checking control results. Specifically, as shown in FIG. 6B, the camera station control unit 20 is divided into a platform control unit 321 and a camera control unit 322.

The platform control unit 321 controls movement of the platform 12 of the corresponding camera station, that is, movement of the camera station 10, by transmitting the control information input by the user to the designated camera station 10. In this case, when the platform 12 is capable of autonomous movement, the control information may be transmitted to the autonomous controller 124 of the platform, but when the platform is a manned platform, the control information may be transmitted to the control information communicator 121.

The camera control unit 322 may control directional changes (tilting, rotation, etc.), zoom-in and zoom-out functions, etc. of the camera. In some cases, directional changes of the camera may be handled by the platform control unit 321. To this end, it is preferable for the camera control unit 322 to transmit relevant information in the control information input by the user to the camera 13 of the camera station 10. Meanwhile, the camera control unit 322 may have an additional function of automatically stopping the zoom-in function so that the face or a specific part of a person is not enlarged to a certain size or more in the case of executing the zoom-in function. For this function, information on a video size may be received from the video analysis unit 360.

The zoom operations (i.e., zoom-in and zoom-out) of the camera 13 may be performed using a digital zoom method, and an imaging direction of the camera 13 may be controlled by providing parts of two-dimensional (2D) panoramic videos obtained from a plurality of cameras. Here, it is illustrated that the camera selection unit 310 and the camera station control unit 320 are included in the server 30, but the present invention is not limited thereto. In other words, as described above, the camera station selection unit 310 and/or the camera station control unit 320 may be implemented not in the server 30 but in a secondary server (not shown) which controls the plurality of camera stations 10, and the server 30 may transmit the control information of the user to the secondary server so that the secondary server directly controls the camera station 10. The video management unit 330 receives videos captured by the camera 13, selectively stores, analyzes, and processes the videos, and provides the results to the user. To this end, the video management unit 330 analyzes the videos using the video analysis unit 360 to assign video-related keywords to the videos and provides the keywords to the user through the camera station selection unit 310, thereby providing a function for the user to easily search videos and edit his or her own video. As necessary, previously provided camera station information may be used. In other words, a video in which it rains on Waikiki Beach in Hawaii may have keywords such as "Hawaii Waikiki," "beach," and "rain," and a video in which the sun rises from the top of the Haleakala mountain on the Hawaiian island of Maui may have keywords such as "Hawaii Maui Haleakala" and "volcano sunrise," on the basis of real-time weather information, location information, and video analysis information. Similarly, when the user searches for "aurora," camera videos of areas in which an aurora is currently happening may be found and provided.

The video processing unit 340 handles a function of processing a video under a given condition. First, there is a mosaic function. Apart from the additional zoom-in stop function of the camera control unit 322 for automatically stopping the zoom-in function so that the face or a specific part of a person is not enlarged to a certain size or more in the case of executing the zoom-in function, the video processing unit automatically performs modification or alteration, such as mosaicking, blurring, etc., on the face or specific part. The video processing unit 340 may also have a function of automatically mosaicking or blurring personal information, such as a company name, a phone number, a vehicle number, etc., so that (zoom-in can be continuously performed but) the personal information is unidentifiable. The company name, the phone number, or the vehicle number is demosaicked or deblurred when the owner of the company name, the phone number, or the vehicle pays an advertising fee. To this end, the billing and advertisement processing unit 370 to be described below is used. Information is received from the billing and advertisement processing unit 370, and in the case of modifying or altering a video of a company name, a phone number, a vehicle number, etc., a signboard in the video is identified. It is determined whether the corresponding information is in preset advertiser information, and when the corresponding information is in the preset advertiser information, video modification or alteration may not be performed.

Meanwhile, a video captured by the camera 13 may be output through the video management unit 330 and the video output unit 380 in real time or may be processed through the video processing unit 340 using a video processing technology (image processing) and output (e.g., as a video processed in the form of a picture, such as a pastel painting, a watercolor painting, etc., or a cartoon). Also, the video captured by the camera 13 may be output in combination with a specific image (letters, a symbol string, a photograph, etc.).

The sound processing unit 350 processes sound of videos and outputs the processed sound. The sound processing unit 350 can output the original sound (real sound in the field) without any change. Also, in accordance with sound control information which is set in advance by the user, the sound processing unit 350 can remove the original sound or combine background sounds, such as the sound of a brook, the sound of wind, the sound of waves, the sound of birds, a sound recorded in a forest, music, etc., with the original sound and provide the sound. Also, the sound processing unit 350 can access a sound source website and receive and play a sound source through the user's portable device.

In addition to the above functional elements, the camera service server 30 includes the billing and advertisement processing unit 370.

A user who pays a fee to exclusively use the camera station 10 can manipulate the camera station 10 for a specific period of time, which may be allowed in connection with the billing and advertisement processing unit 370. Meanwhile, according to an intention of a camera occupant, a video of the corresponding camera station 10 may be shared with people who want to view the video for free. An advertisement is displayed to people who view the video for free, and the advertising revenue may be shared with a person who pays a usage fee for the corresponding camera 13 at an appropriate ratio. When a third party accesses the video through the advertisement and views the video, the usage fee is paid together with the camera user (occupant) in a shared manner. The amount of payment is deposited into the user's account and offset against the usage fee paid by the user or returned in cash. According to the present embodiment, the video processing unit 340, the sound processing unit 350, the video analysis unit 360, the billing and advertisement processing unit 370, etc. are separately configured to describe functionality thereof, but in practice, they can be implemented in various ways as a combination of software and hardware. Also, the operations may not be sequentially processed, and some operations may be simultaneously processed.

Figure 7A:
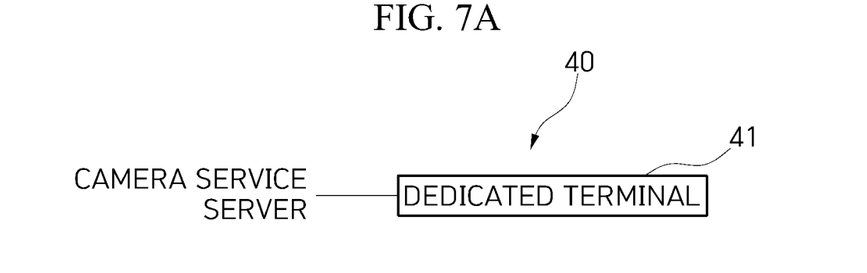
FIGS. 7A to 7C are example implementation diagrams of a user terminal device (40).
Figure 7B:
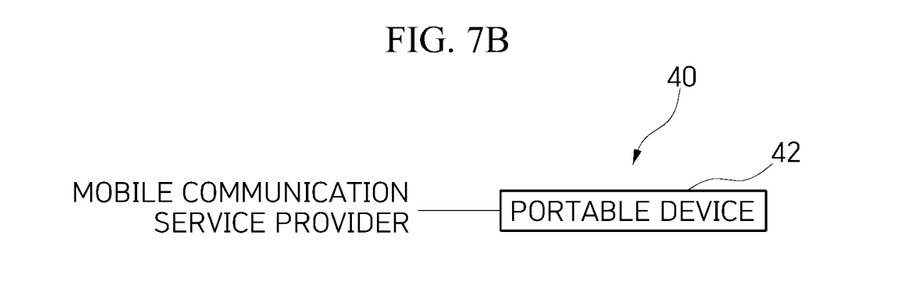
Figure 7C:
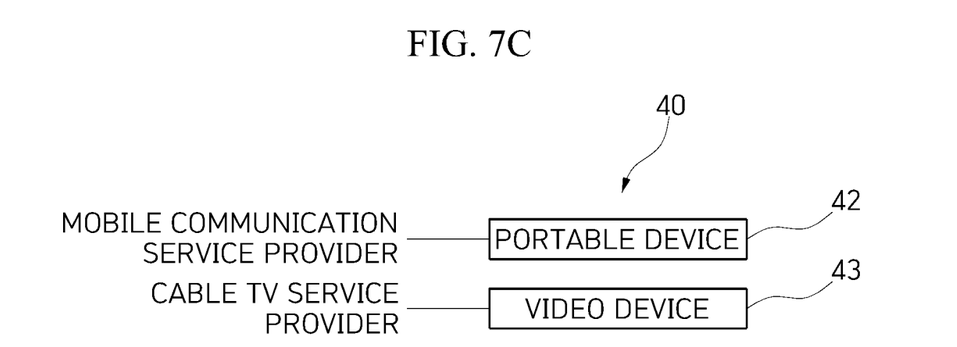

FIGS. 7A to 7C show various implementation examples of the user terminal device 40.

As shown in FIG. 7A, the user terminal device 40 may be implemented as a dedicated terminal 41 that is connected to the camera service server 30 using a wired or wireless communication network. An operator of the camera service system may design the dedicated terminal 41 with a configuration and user interface (UI) optimized for the camera service. The dedicated terminal 41 may be a general-use computer, such as a personal computer (PC) or the like, or a dedicated device designed with architecture specialized for video service systems.

Also, as shown in FIG. 7B, the user terminal device 40 may be implemented as a portable device 41, such as a mobile phone, a smartphone, a tablet PC, etc., connected to the camera service server 30 through a mobile communication service provider. The user may log in to the camera service server 30 using an application installed on the portable device 41 and use the portable device 41 as a terminal for user control and a video output terminal.

Further, as shown in FIG. 7C, the user terminal device 40 may be a portable device 42 and a video device 43 such as a television (TV) receiver or the like. Here, the video device may be a cable or satellite set-top box or a TV receiver capable of establishing an Internet connection. In the case of this implementation example, the user may use his or her portable device 42 as a terminal device for user control (i.e., a control terminal) and use the video device 43 as a terminal device for video output (i.e., a video terminal).

For example, the user may log in to the camera service server 30 using an application of a portable phone (or a smartphone) and then receive a video through his or her set-top box using a TV by inputting subscriber information provided by a cable company that the user subscribes to. Since a program embedded in a cable set-top box can distinguish subscriber set-top boxes and transmit a video specialized for each subscriber as in a video on demand (VOD) service, the camera service server 30 of the present invention can also provide the service in the same manner.

In the case of a TV receiver capable of establishing an Internet connection, the receiver may log in to the camera service server 30 and then register a phone number of a cell phone to be used as a user control terminal so that problems can be solved. In this case, when the user is connected to the camera service server 30, an application on the portable phone is automatically activated, and thus it is possible to use the service as a control terminal.

As described above, the user terminal 40 is divided into a control terminal (i.e., a portable device) for a user to control the camera 13 and a video terminal for the user to receive a video, and thus it is possible for him or her to conveniently use a portable device, such as his or her portable phone, tablet PC, etc., as a control terminal while viewing a video captured by a camera through a large-screen device such as a TV.

Figure 8:
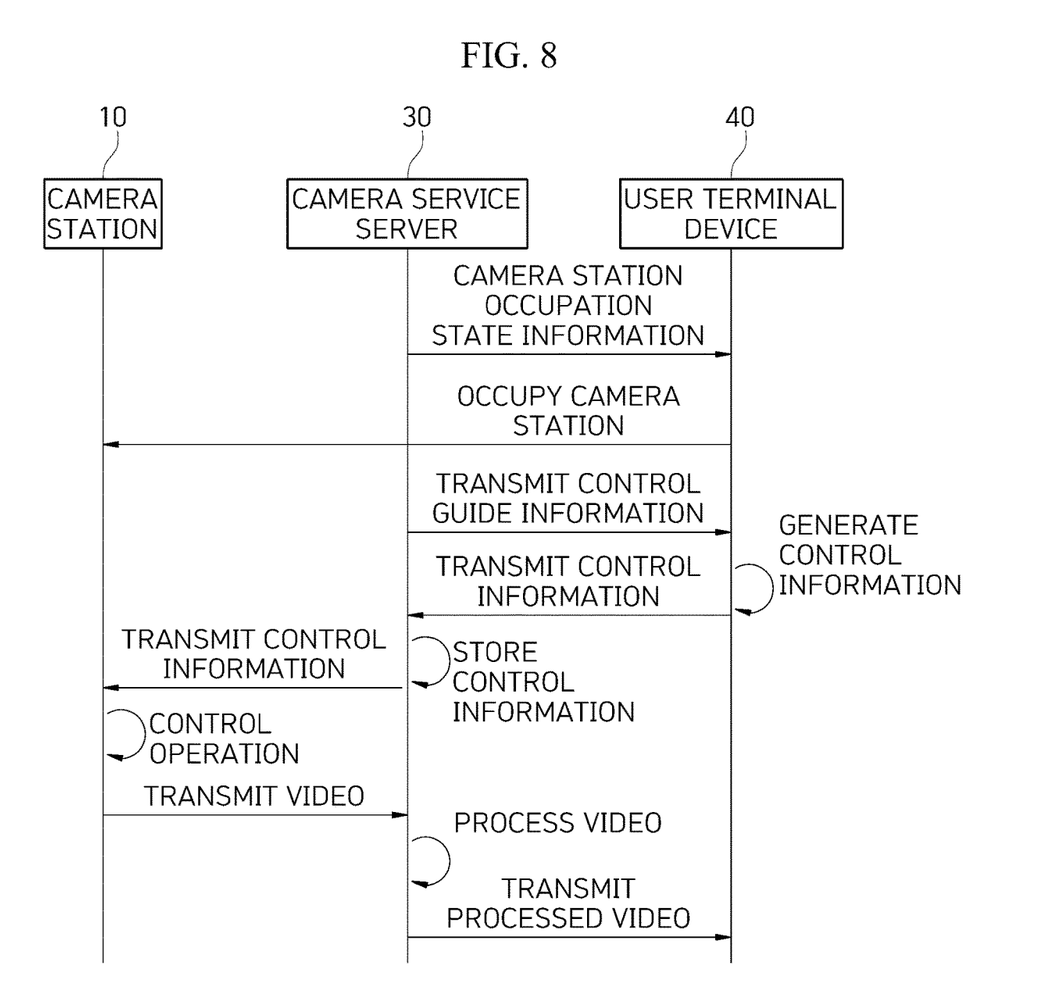
FIGS. 8 and 9 are sequence diagrams illustrating processes of a camera service method according to the present invention.

FIG. 8 illustrates a process of a camera service method performed in the above-described camera service system. Referring to FIG. 8, the camera service method according to the present invention includes:

an occupation state information transmission operation in which the camera service server 30 transmits occupation state information of the camera station 10 to the user terminal device 40;

a camera station occupation operation in which the user selects and occupies the camera station 10 with reference to the occupation state information received by the terminal device 40;

a control guide information transmission operation in which the server transmits control guide information for the camera station 10 of which occupation is completed to the user terminal device 40;

a control information generation operation in which the user generates control information for manipulating the camera station 10 with reference to the received control guide information and transmits the control information to the server 30;

a control information transmission operation in which the server 30 stores the received control information and transmits the control information to the camera station 10, wherein the reason that the server 30 stores the received control information is for finding a cause of an accident or problem that arises;

a control and video transmission operation in which the platform 12 of the camera station 10 is moved according to the received control information, a zoom operation and/or an imaging direction of the camera 13 are controlled according to the received control information, and the camera 13 transmits a captured video to the server 30;

a video processing operation in which the server checks and processes the received video; and a processed video transmission operation in which the server transmits the processed video to the user terminal device, wherein the server may transmit the video with a certain delay time to prevent display of an unexpected scene such as an accident scene or the like.

Here, the occupation state information of the camera station 10 may include billing information for charging. In this case, the camera station occupation operation may be completed when the user selects the camera station 10 with reference to the occupation state information and pays a set fee according to the billing information.

Also, the occupation state information of the camera station 10 may include reservation information. In this case, the camera station occupation operation may be completed when the user selects and reserves the camera station 10 with reference to the occupation state information.

Further, the occupation state information of the camera station 10 may include advertisement notification information. In this case, the camera station occupation operation may be completed when the user selects the camera station 10 with reference to the occupation state information and views a provided advertisement.

Moreover, the control guide information may include a plurality of control information cases including sequential control information for the camera station 10. In this case, the control information may be one of the control information cases.

Meanwhile, the video processing operation may include an operation of performing image processing when the face of a person in the video is a certain size or more so that the face is unidentifiable.

Also, the video processing operation may include an operation of performing image processing when a license plate of a vehicle in the video is a certain size or more so that the license plate is unidentifiable. In the case of signboard in the video, it may be identified in the video processing operation and then subjected to image processing to be unidentifiable unless the corresponding information is in preset advertiser information.

In the video processing operation, as described above, a camera video may be subjected to image processing to be shown as a picture or cartoon and then output.

In the video processing operation, sound which is processed by combining original sound of the video with another sound source or removing the original sound according to preset sound control information may be output in combination with a video.

The control information transmission operation may include a control information validity test operation in which the server 30 tests whether the received control information is valid, that is, whether the control information is included within a controllable range, and a control information processing operation of transmitting control information to the platform and the camera when it is determined through the control information validity test that the control information is within the controllable range and performing a preset operation and warning the user that the control information deviates from the controllable range when the control information is outside the controllable range.

In the processed video transmission operation, the server 30 may delay the processed video for a certain time and then transmit the processed video to the terminal 40.

Figure 9:
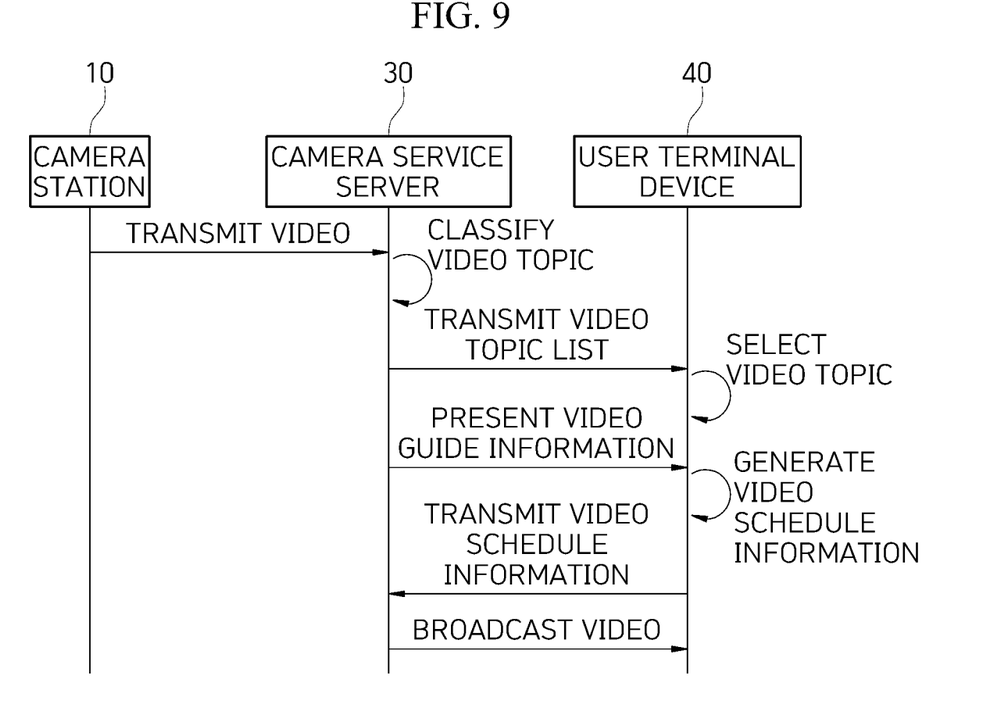

FIG. 9 is a process sequence diagram of a case in which a user receives his or her own video channel service according to a video service method of the present invention. This case illustrates a process of a case in which a cable TV user uses a video service of the present invention by pressing a remote control of the cable TV. Accordingly, in this case, the user terminal device 40 is a cable or satellite set-top box or a TV receiver capable of establishing an Internet connection.

Referring to FIG. 9, in a camera service method according to this embodiment, an operation in which the camera station 10 transmits a captured video to the server 30;

a video topic classification operation in which the server 30 classifies a video topic of the corresponding camera station 10 according to a video topic list that is set by analyzing keywords of the plurality of camera stations 10 in real time;

a video topic list transmission operation in which the server 30 transmits the video topic list to the user terminal device 40;

a video topic selection operation in which the user selects a video topic in the video topic list received by the terminal device 40, whereas according to another embodiment, the user may set a desired video topic(s) in a video topic setting screen in advance and the server may collect the video topic(s) to generate a video topic list;

a video guide information presentation operation in which the server 30 selects a video(s) and a sound source(s) corresponding to the selected video topic and transmits corresponding information to the user terminal device 40;

a video schedule information generation operation in which the user selects a video(s) and a sound source(s) with reference to the video guide information received by the terminal device 40 and video schedule information is generated and transmitted to the server 30; and a video broadcasting operation in which the server 30 sequentially transmits videos and sound sources to the user terminal device 40 according to the received video schedule information are performed.

In the above, the keywords of the camera stations 10 may be installation location information, natural attributes of the installation location, real-time weather information of the installation location, a date, a time, observation information, etc.

Further, when the platform 12 moves along a specific route, keywords of the camera station 10 may be a type of platform, a travel route, etc.

Also, a sound source included in the video broadcasting information may be a sound source stored in a system managed by a third computer.

Scenarios for actually using the above-described camera service system and method according to the present invention will be described below through specific examples.

Usage Example 1

This is a usage example in which a user accesses a camera service website (e.g., the camera service server 30 of FIG. 1) of the present invention using a dedicated application installed on his or her portable phone and uses the camera service. Here, it is assumed that a user control terminal device is the portable phone and a user video terminal device is a TV receiver. In this case, the user should make a setting in advance to use the TV receiver and the portable phone as a video terminal and a control terminal, respectively. A method of setting the user video terminal device is as follows. First, the user turns on the TV receiver to be designated as the user video terminal device and accesses a website constructed on the camera service server 30 through the Internet. After that, when the user clicks a user control terminal menu shown on the TV screen (using a remote control), a 16-digit code is displayed on the TV screen. The user executes a video service application on his or her portable phone which is the user control terminal device, touches a displayed user video terminal designation menu, and inputs the 16-digit code. Then, the corresponding TV receiver is designated as the user video terminal device.

1) After setting up the TV receiver and the portable phone as described above, the user selects a desired area on a map provided by the dedicated application installed on the portable phone. For example, assuming the user selects the Seongsan Ilchulbong area of Jeju Island in Korea, a service provider's promotional video of the area is transmitted to the TV receiver, and available camera stations are shown on a map displayed in the application of the portable phone. It is assumed that the camera stations have a drone camera, a fixed camera, and a submarine camera according to platform types.

2) The camera service server generates occupation state information of the camera stations and transmits the occupation state information to the portable phone which is the user control terminal device (see FIG. 8, the same below).

The received camera station occupation state information is displayed on the map through a portable phone screen. The camera occupation state information may be displayed using icons (e.g., a drone is displayed as a drone-shaped icon and a submarine is displayed as a submarine-shaped icon). Alternatively, display may be performed in stages. First, only the camera station occupation state may be simply displayed, and then detailed information may be displayed through a word balloon or the like when the user touches a specific camera station.

Examples of camera station occupation state information are shown in the following table.

TABLE 1

1. Drone camera unit 1 (in use)
Platform = drone, Resolution 4K, Available time 09:00-19:00, Flight altitude 100-500 m, Controllable, 16-times zoom, Clear, Beach, Flyable area map, Real-time video view, Stored video view, Usage fee 10 dollars (10 minutes)
2. Drone camera unit 2 (available)
Platform = drone, Resolution 4K, Available time 09:00-19:00, Flight altitude 50-500 m, Controllable, 16-times zoom, Clear, Beach, Flyable area map, Stored video view, Use, Usage fee 10 dollars (10 minutes)
3. Fixed camera unit 1 (available)
Platform = fixed (Top of Ilchulbong), Resolution 4K, Available time 24 hours, Controllable, 16-times zoom, Fog, Top of Ilchulbong, Beach, 360-degree rotatable, Usage fee 2 dollars (10 minutes)
4. Drone camera unit 3 (available)
Platform = drone, Resolution 8K, Available time 07:00-21:00 for 30 minutes from every hour on the hour, Flight altitude 100-3,000 m, Clear, Beach, 16-times zoom, Planned flight along a fixed route (shown on the map), Free charge, Video sharing possible
5. Submarine camera unit 1 (reservation available)
Platform = submarine, Resolution 8K, Available time 10:00-18:00 for 30 minutes from every hour on the hour, Diving depth 30 m, 16-times zoom, Under the sea, Requestable for a route (shown on the map), Fee 300 dollars (30 minutes)

3) Then, the user carries out a camera station occupation operation of selecting and occupying a camera station with reference to the camera station occupation state information displayed on the portable phone. In the above-illustrated camera station occupation state information, drone camera unit 1 is controllable but being occupied and used by another user. Accordingly, the user can view a video of the corresponding drone camera by touching "real-time video view" or "stored video view." However, the user cannot occupy drone camera unit 1, and only sharing is possible. Meanwhile, free members can view the video after viewing an advertisement, and paid members, such as monthly paid members and the like, can view the video without any advertisement.

When the user wants to use drone camera unit 2 and clicks "use" for drone camera unit 2, the application of the portable phone opens a popup window to receive a usage time and opens a usage fee payment guide popup window to receive the fee, thereby finishing the occupation procedure. When there is no usage fee, the occupation procedure may be finished by simply expressing the intention to occupy drone camera unit 2.

4) When the occupation procedure of drone camera unit 2 is completed, a control guide information transmission operation in which the server transmits control guide information for drone camera unit 2 to the user's portable phone is performed.

The transmitted information which is displayed on the portable phone screen displays a current location on the map, shows a current video of the camera, and arranges and provides buttons required for drone control. Here, the current video is also transmitted to the TV receiver which is the user video terminal device.

Then, the user can view videos that he or she wants to view by controlling drone camera unit 2. In other words, from that point, a control information generation operation in which the user generates control information for controlling the camera station of drone camera unit 2 with reference to the control guide information received by the portable phone and transmits the control information to the server, a control information transmission operation in which the server stores the received control information, tests whether the control information is valid, and then transmits the control information to the platform and camera of the drone camera unit 2, a control operation in which the drone of drone camera unit 2 moves according to the received control information and the camera attached to the drone transmits a video that is captured while a zoom operation and the imaging direction are controlled according to the received control information, a video processing operation in which, when the face of a person in the received video is identifiable, the server processes the video to blur the face and transmits the processed video, and when the user sets the video to watercolor tones, the server processes the video into watercolor tones through image processing, and a video transmission operation in which the server transmits the processed video to the user video terminal device are repeatedly performed.

In the video transmission operation, the server may transmit the video with a certain delay time, and such delayed video transmission serves to prevent display of an unexpected scene such as an accident scene and the like. Meanwhile, before starting a flight, the user can make or select a flight plan to control drone camera unit 2. In this case, a flight-planning screen for setting a flight altitude, a flight route, a flight speed, a camera motion, etc. is displayed on the user's portable phone. Here, on the flight planning screen, recommended examples or experts' flight planning examples may be presented and selected. For example, phrases representing flight characteristics, such as "comfortable flight," "dynamic flight," "random flight," and "fantastic flight proposed by expert 1," may be shown to the user. When the user selects and executes a flight plan, drone camera unit 2 moves along a route according to the determined plan, and the direction of the camera may be controlled by the user any time so that the user may view a realistic video.

When the user is allowed to share the video of drone camera unit 2 with others, it may be displayed to others who access the video that drone camera unit 2 is occupied by another user but the video can be shared. When the video is accessed by and shared with others and the occupant of drone camera unit 2 receives a part of advertising revenue, the occupant of drone camera unit 2 will make an effort to prepare his or her flight plan so that many people will share the video.

Meanwhile, in usage example 1, a drone keeps information on an area in which the drone is movable, compares received control information with the information, and controls itself to be in the area in which the drone is movable at all times. Also, the drone may be programmed to return to a starting location or land at a nearby emergency standby location according to a determined algorithm when an uncontrollable situation occurs such as battery discharge, a wind speed increase, etc.

5) A case in which the user uses submarine camera unit 1 will be described below. It is assumed that the current time is 9:40 a.m. When the user clicks "use," a popup window is opened to show a popup screen for providing information on a payment of the usage fee, and the user pays the fee to complete the occupation procedure. Meanwhile, in the case of submarine camera unit 1, it is before 10 a.m. which is the departure time of the submarine. Accordingly, in this case, the occupation procedure is completed because the camera is reserved.

When the occupation procedure of submarine camera unit 2 is completed, a control guide information transmission operation in which the server transmits control guide information for the submarine that is the platform of submarine camera unit 2 and the installed camera to the user's portable phone is performed. The transmitted information is displayed on the screen of the portable phone, and a current location and an area in which the submarine can move may be displayed on a map. The user marks his or her desired travel route in the area in which the submarine is movable and transmits the travel route to the server as control information.

The server provides the control information to a helmsman of the submarine through a control information communicator, and the helmsman controls a controller and an actuator for controlling movement of the submarine to move along the route requested by the user at the reserved time. Meanwhile, a video is transmitted to the TV receiver and displayed, and the camera attached to the submarine may be controlled by the user during movement. As necessary, the submarine helmsman may connect with the user by voice and listen to the explanation.

Usage Example 2

Usage example 2 is a scenario of a case in which a user receives his or her own video service channel (see FIG. 9, the same below). For example, the user who uses a cable TV subscribes to a cable TV service through a local cable TV service provider and uses a set-top box. Here, most cable TV set-top boxes provide a cable communication network. Accordingly, when a program is provided in the cable set-top box, the user can immediately use the video service of the present invention by pressing a remote control of the cable TV. The video service of the present invention may be run so that the user pays an additional fee to use the video service through the cable TV.

When the user executes the video service by pressing the remote control, a video topic setting screen is displayed on the screen of the TV receiver. The user may set a desired video topic on the video topic setting screen or select a desired video topic from a preset video topic list. The video topic list is transmitted by the server to the cable TV set-top box which is a user terminal device, and video topics are set in consideration of a location at which the camera is installed, the weather of the corresponding location, attributes of the location, etc. For example, the user can set a video topic using words such as "my country, rain, beach." Also, a topic can be set using natural words such as "walking on a rainy beach" or "flying in the sky at night with the moon." In this case, the server may analyze such natural words to find keywords, such as "rain, beach, movement," "night, moon, sky, movement," etc., and use the keywords in classifying cameras.

Meanwhile, the server analyzes feature information (keywords) of cameras which are installed at many places and classifies each of the cameras by location, weather, and location attributes. In the case of a movable platform, a type and travel route of the platform may also be used as a criterion for classification. For example, when a video topic set by the user is "Europe, clear day, forest," the video service system searches cameras installed in European forests for a camera(s) currently capable of providing a video of clear sunlight shining through a forest and presents the camera(s) to the user. In this case, sound sources that complement the video may be presented together. The sound sources may be stored in the server and provided or may be streamed in real time from another sound source website. Also, when the user removes the sound source, only the sound of surroundings may be used without any sound source, or the sound of surroundings may be used in combination with the sound source.

Now, it is assumed that, according to video schedule information set by the user, a total of 20 videos are broadcast by turns at intervals of five minutes, the Four Seasons by Vivaldi is used as a sound source, and the user wants a sound synthesized with 20% of the sound of surroundings and 80% of the sound source. Then, the video service system (server) picks out videos including all of "Europe," "forest," and "sunlight" among videos of camera stations, transmits the videos of "European forests with shining sunlight" to the set-top box of the user by turns at intervals of five minutes, and provide the Four Seasons by Vivaldi in real time in combination with the sound of surroundings.

Video schedule information selected by the user may be named, stored in a user setting, and used again. However, even when the same video schedule information is selected, it is possible to enjoy not the same video but a realistic real-time video because videos are provided in real time. Meanwhile, when no video corresponds to the video topic selected by the user or there are not enough videos corresponding to the video topic, recorded videos may be provided with the mark "recorded video" so that the user's width of selection can be increased.

As another example, when the user selects "flying in the sky at night with the moon" as a video topic, the server may find the keywords "moon, night, sky, movement" and then specify an area in which the moon is visible using the date and the time information. Also, in the corresponding area, the server may retrieve cameras installed on an aerostat drone, a hot air balloon, an airplane, etc. and travel routes using the topic words "sky" and "movement" and present the cameras and travel routes to the user or may pick out corresponding ones from recorded videos. For example, it is possible to pick out and present cameras moving in the sky such as drone 1 (Waikiki Beach in Hawaii) and hot air balloon 1 (Cappadocia in Turkey).

The user can select a desired video(s) among the videos and generate and transmit video schedule information to the server, thereby receiving the desired videos through the cable TV set-top box as described above. For example, when there are a total of 10 videos, the videos are broadcast in turns at intervals of 10 minutes, a sound source is a nocturne by Chopin, and the user wants a sound synthesized with 30% of the sound of surroundings and 70% of the sound source according to the video schedule information set by the user, the server picks videos corresponding to the topic, transmits the videos which are transmitted by a drone and a hot air balloon flying in the sky at night with the moon to the set-top box of the user in turns at intervals of 10 minutes, and provides the nocturne by Chopin in real time in combination with the sound of surroundings.

Although the present invention has been described above in detail through exemplary embodiments, those skilled in the technical field to which the present invention pertains should appreciate that the present invention can be implemented in specific forms other than those disclosed herein without changing the technical spirit or essential characteristics of the present invention. The above-described embodiments are to be understood as illustrative and not limiting in all aspects. Also, the scope of the present invention is determined by the following claims rather than the detailed description, and all alterations or modifications derived from the claims and equivalents thereto should be construed as falling within the technical scope of the present invention.

The invention claimed is:

1. A camera service system comprising:
a plurality of camera stations including a movable platform and a camera installed on the platform and allowing control of any one of a zoom operation and an imaging direction, wherein a keyword is given to each of the plurality of camera stations;
a camera service server connected to the camera station through a communication network;
a control terminal connected to the camera service server through the communication network and configured to control the camera station through the camera service server; and
a video terminal that receives and displays a video captured by the camera from the camera service server through the communication network,
wherein the keyword given to each of the plurality of camera stations include a fixed keyword including platform information and camera information, and a variable keyword including weather, time, and a travel route of the platform,
wherein, the control terminal is configured to generate control information for controlling the platform and the camera of the camera station and to transmit the control information to the camera service server through the communication network,
the camera service server is configured to receive the control information from the control terminal through the communication network and to transmit the received control information to the camera station through the communication network,
the camera station is configured to receive the control information from the camera service server through the communication network, to control the platform and the camera, and to transmit the video captured by the camera to the camera service server through the communication network, and
the video terminal is configured to receive the captured video from the camera service server through the communication network and display the received video.

2. The camera service system of claim 1, wherein the platform is movable by manipulation by an operator and comprises:
a control information receiver configured to receive the control information from the camera service server through the communication network and display the control information to the operator;
a controller configured to enable the operator to control movement of the platform; and
a driver configured to move the platform in connection with the controller.

3. The camera service system of claim 1, wherein the platform is autonomously moveable and comprises:
an autonomous controller configured to receive the control information from the camera service server through the communication network and control movement of the platform according to the control information; and
a driver configured to move the platform in connection with the autonomous controller,
wherein the autonomous controller compares the received control information with preset operable range information and controls the movement of the platform according to the control information when the received control information is within the preset operable range information.

4. The camera service system of claim 1, further comprising a video processing unit configured to alter, when a face of a person in the video captured by the camera is a preset size or more, the face so that the face is unidentifiable.

5. The camera service system of claim 1, further comprising a video processing unit configured to alter personal information in the video captured by the camera so that the personal information is unidentifiable, change the video captured by the camera by performing image processing, and combine another image with the video captured by the camera.

6. The camera service system of claim 1, further comprising a sound processing unit configured to change sound included in the video captured by the camera.

7. The camera service system of claim 1,
wherein the control terminal comprises a portable device communicating with the camera service server through the communication network, wherein the video terminal comprises a TV receiver receiving the video from the camera service server through the communication network.

8. A camera service method performed in the camera service system as claimed in claim 1 which includes the plurality of camera stations, the camera service server, the control terminal, and the video terminal
the camera service method comprising:
an occupation state information transmission operation of transmitting, by the camera service server, occupation state information of the camera station to the control terminal;
a camera station occupation operation of selecting and occupying, by the control terminal, the camera station with reference to the occupation state information received by the control terminal;
a control guide information transmission operation of transmitting, by the camera service server, control guide information for the camera station of which occupation is completed to the control terminal;
a control information generation operation of generating, by the control terminal, control information for manipulating the camera station with reference to the control guide information received by the control terminal and transmitting the control information to the camera service server;
a control information transmission operation of transmitting, by the camera service server, the received control information and then transmitting the control information to the camera station;
a control and video transmission operation of moving the platform of the camera station according to the received control information, controlling the zoom operation and the imaging direction of the camera according to the received control information, and transmitting, by the camera station, a captured video to the camera service server;
a video processing operation of checking and processing, by the camera service server, the received video; and
a video transmission operation of transmitting, by the camera service server, the processed video to the video terminal.

9. The camera service method of claim 8, wherein the video processing operation comprises alteration a face of a person in the video captured by the camera so that the face is unidentifiable.

10. The camera service method of claim 8, wherein the video processing operation comprises changing the video captured by the camera through image processing.

11. The camera service method of claim 8, wherein the video processing operation comprises combining another image with the video captured by the camera.

12. The camera service method of claim 8, further comprising changing sound included in the video captured by the camera.

13. The camera service method of claim 8, wherein the control information transmission operation comprises:
a control information validity test operation of testing, by the server, whether the received control information is valid; and
a control information processing operation of transmitting the control information to the camera station when it is determined in the control information validity test operation that the control information is within a controllable range, and performing a preset operation and warning the user that the control information deviates from the controllable range when the control information is outside the controllable range.

14. The camera service method of claim 8, wherein the video transmission operation comprises delaying, by the server, the processed video for a preset time and then transmitting the processed video to the control terminal.

15. The camera service method of claim 8, wherein the control guide information includes a plurality of control information cases including sequential control information for the camera station,
wherein the control information is one of the control information cases.

16. The camera service method of claim 8, further comprising:
transmitting, by the camera station, the captured video to the camera service server;
a video topic classification operation of analyzing, by the camera service server, a keyword of the camera station in real time and classifying a video topic of the camera station according to a preset video topic list;
a video topic list transmission operation of transmitting, by the camera service server, the preset video topic list to the control terminal;
a video topic selection operation of selecting, by the control terminal, the video topic in the video topic list received by the control terminal;
a video guide information presentation operation of selecting, by the camera service server, videos and sound sources corresponding to the selected video topic and transmitting video guide information to the control terminal;
a video schedule information generation operation of selecting, by the control terminal, the videos and the sound sources with reference to the video guide information received by the control terminal, generating video schedule information, and transmitting the video schedule information to the camera service server; and
a video broadcasting operation of sequentially transmitting, by the camera service server, the videos and the sound sources to the video terminal according to the received video schedule information.

17. The camera service method of claim 16, wherein the platform of the camera station moves along a specific route, and
the keyword of the camera station includes any one of a type and travel route of the platform.

18. The camera service method of claim 16, wherein the sound sources are stored in a system managed by an external computer.

19. The camera service method of claim 16, wherein the camera station is provided by a third party, and
- in order to provide the camera station of the third party, the method further comprises:
- providing, by an owner of the camera station, his or her camera station information to a camera service provider;
- checking, by the camera service provider, the provided camera station information, testing the camera station, and determining whether to register the camera station at an appropriate time; and
- when it is determined to register the camera station, registering the camera station in the camera service system and disclosing the camera station to the user.

\* \* \* \* \*